United States Patent [19]

Ashley

[11] Patent Number: 4,814,929

[45] Date of Patent: Mar. 21, 1989

[54] BREAKER BOX INTERFACE DEVICE

[76] Inventor: R. David Ashley, 1727 Amherst Rd., Knoxville, Tenn. 37909

[21] Appl. No.: 90,461

[22] Filed: Aug. 28, 1987

[51] Int. Cl.$^4$ .............................................. H02H 3/06
[52] U.S. Cl. ........................................ 361/1; 361/62; 307/35; 307/39; 307/141.4
[58] Field of Search ...................... 361/1, 62; 364/483; 307/35, 38, 39, 40, 140, 141, 141.4

[56] References Cited

U.S. PATENT DOCUMENTS

| | | | |
|---|---|---|---|
| 4,228,364 | 10/1980 | Walden | 307/38 |
| 4,292,543 | 9/1981 | Reed, Sr. | 307/35 |
| 4,318,006 | 3/1982 | Himeno et al. | 307/38 |
| 4,324,987 | 4/1982 | Sullivan, II et al. | 364/492 |
| 4,454,555 | 6/1984 | DePuy | 307/141 |

Primary Examiner—A. D. Pellinen
Assistant Examiner—Jeffrey A. Gaffin
Attorney, Agent, or Firm—Pitts and Brittian

[57] ABSTRACT

A device (10) for interfacing a line voltage breaker box (14) with a low voltage controller (30). The device (10) includes a housing (12) which shields the electrical component contained therein. A plurality of low voltage connectors (46) are mounted in the housing and electrically connected with a low voltage controller (30). Each of the connectors (46) includes a low voltage actuator (32) which is selectively energized by the controller (30). A plurality of line voltage connectors (56) are mounted in the housing (12) at a location spaced from the low voltage connectors (46). These line voltage connectors (56) electrically connect line voltage to breakers (16) in the breaker box. Each of the connectors (56) include a line voltage switch or contact (54) which is operatively associated with at least one of the actuators such that energization of the actuator causes the switch (54) to close and power to be supplied to said breakers and appliances operatively associated therewith.

6 Claims, 3 Drawing Sheets

BREAKER BOX INTERFACE DEVICE

DESCRIPTION

1. Technical Field

This invention relates to a device for interfacing a line voltage breaker box with a low voltage controller. More specifically, the device is particularly suited for use in connection with energy management systems in which a low voltage controller selectively energizes appliances including, but not limited to, HVAC systems for the conservation of energy.

2. Background Art

A breaker box of conventional design provides distribution points for power supplied to certain commercial buildings, residences or the like. The line power, or voltage, is fed through the breaker box and distributed through individual breakers to the various appliances including the HVAC system normally associated with such a building. In the event that current through a breaker exceeds a preselected value, the breaker is tripped and thereby disrupts the flow of power to the operatively associated appliances until remedial action is taken.

Inasmuch as a breaker box serves as a distribution point for line voltage to various appliances, it serves as an ideal location for managing the energy consumption of loads fed through the breaker box. Typically, such energy management equipment uses low voltage for control purposes, and requires the installation of numerous operatively associated relays or the like in order to perform the necessary controlling functions over conventional HVAC systems and other appliances. These relays are often installed at myriad locations proximate the controlled appliance such that the low voltage controller can regulate the "on" and "off" times and/or duty cycles of the appliances. Known prior art generally related to the field of the present invention is described in the following U.S. Pat. Nos.: 4,292,543; 4,321,477; 4,310,770; 4,216,383; 4,180,744; 4,125,782; 4,349,879; 4,204,127; 4,105,097; 4,335,437; 4,110,825; 4,363,101; 4,428,022; 4,357,665; 4,211,933; 4,370,723; 4,324,987; 4,336,462 and 4,382,284.

Certain problems remain unsolved by the known prior art, and accordingly, it is an object of the present invention to provide a device for interfacing a line voltage breaker box with a low voltage controller which can be readily installed in an organized manner without the need for additional high voltage wiring. Another object of the present invention is to provide such an interfacing device which can be used in a location remote from the low voltage controller, and connected therewith as by low voltage wiring.

Yet another object of the invention is to provide a device which is powered by utilization of the line voltage fed through a step-down transformer.

It is also an object of the present invention to provide such an interface device in which low power actuators serve to selectively energize the appliances operatively associated with the breaker box. The device of the present invention is easy to mount on the wall of a building and saves costs commonly associated with high current wiring normally required when household and building appliances are controlled by energy management systems.

DISCLOSURE OF THE INVENTION

Other objects and advantages will be accomplished by the present invention which provides a device for interfacing a line voltage breaker box with a low voltage controller. The device includes a plurality of low voltage connectors which are electrically connected with the low voltage controller. Each of the connectors includes a low voltage actuator which is selectively energized by the controller. A plurality of line voltage connectors are connected to circuit breakers in the breaker box. Each of these line voltage connectors includes a line voltage switch which is operatively associated with at least one of the actuators such that selective energization of the actuator causes the line voltage switch to close, thereby supplying power to breakers and appliances operatively associated therewith.

BRIEF DESCRIPTION OF THE DRAWINGS

The above-mentioned features of the present invention will become more clearly understood from the following detailed description read together with the drawings in which.

BEST MODE FOR CARRYING OUT THE INVENTION

Figure 1:
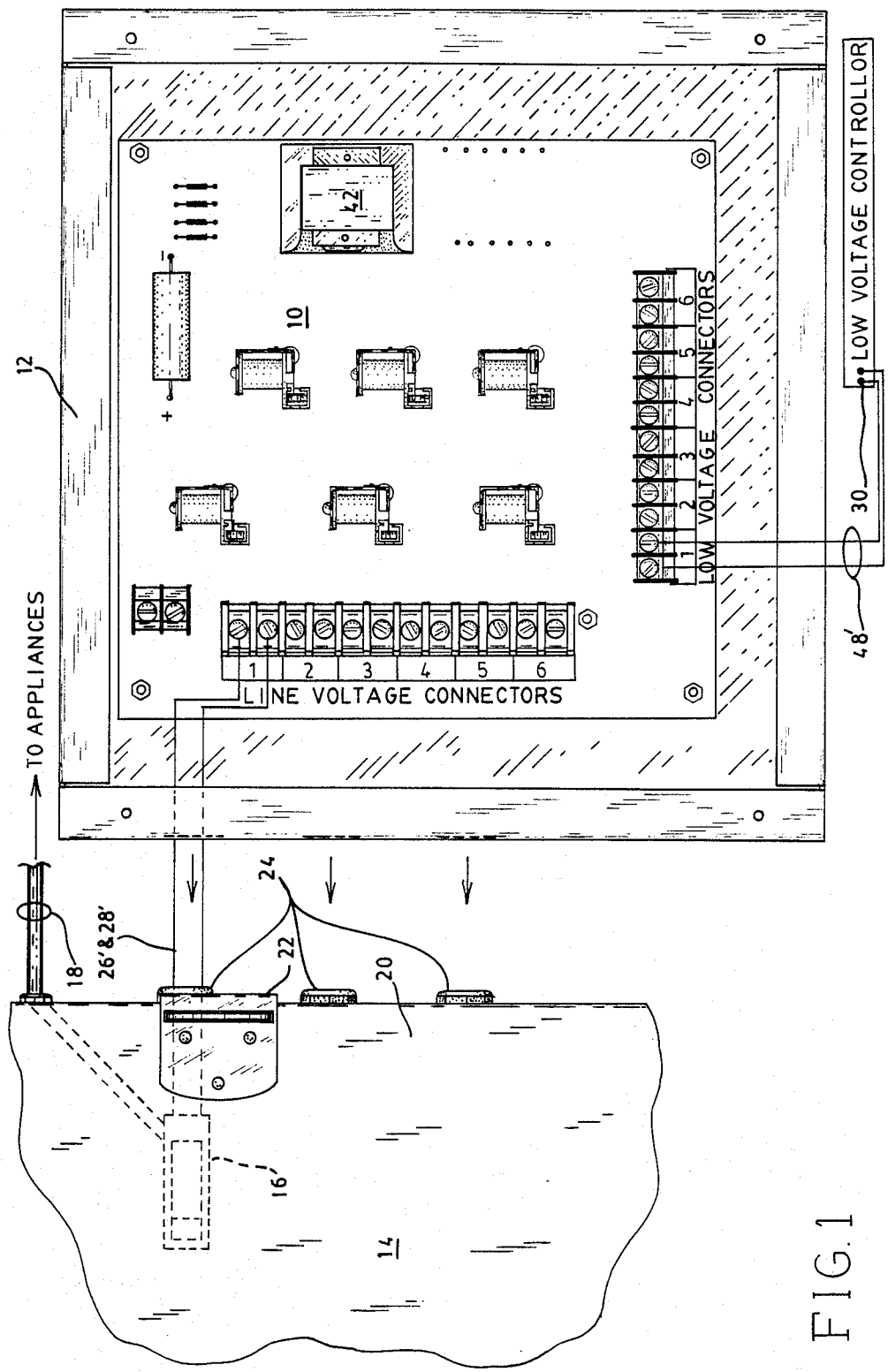
FIG. 1 illustrates a plan view of the device, for interfacing a line voltage breaker box with a low voltage controller, incorporating various features of the present invention.

A device for interfacing a line voltage breaker box is illustrated generally at 10 in FIG. 1. More specifically, the device 10 includes a substantially rectangular housing 12 which includes a cover (not shown) which overlays the perimeter of the housing 12. This housing serves to shield the various electrical and electronic components mounted therein and also facilitates mounting the device 10 on the wall of a building proximate the breaker box illustrated at 14.

Figure 2:
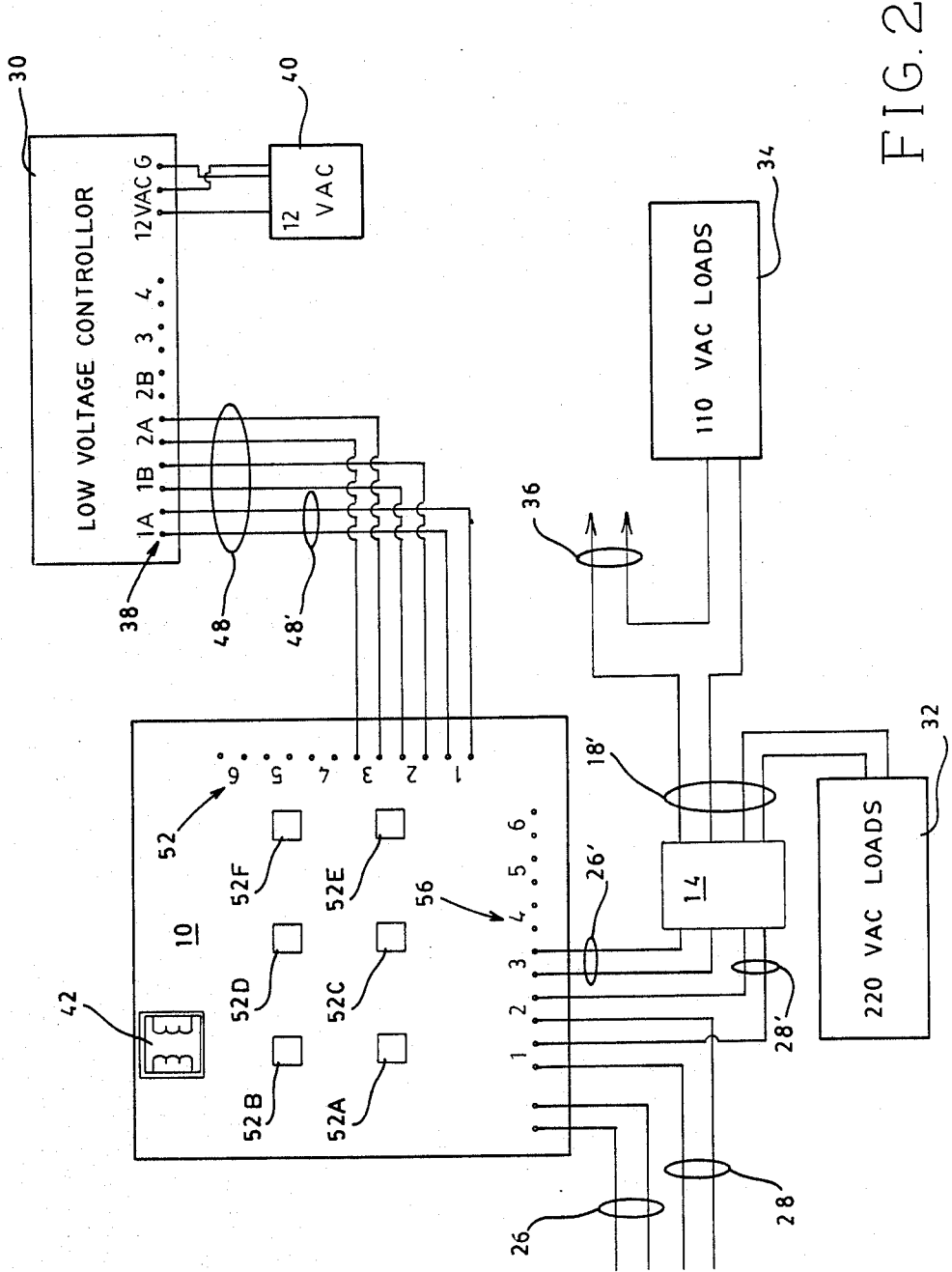
FIG. 2 represents a partial circuit diagram of the device illustrated in FIG. 1 and further illustrates wiring between the device and the operatively associated controller and breaker box.

Before the details of the interfacing device 10 are described, its association with the breaker box 14 will be addressed. This breaker box 14 is of conventional design and supplies line power and voltage through circuit breakers, such as the circuit breaker 16, through high current wiring 18 to the various appliances or loads normally found in certain commercial buildings or residences. The breaker box 14 includes a door 20 which is hingedly mounted at hinge 22 on the breaker box cabinet. A plurality of "knock-outs" 24 facilitate feeding wire or conduit containing wire into the interior portion of the breaker box cabinet where the proper connections are made in a conventional manner. Normally, line power or voltage is supplied to the breaker box through the conventional voltage lines or power lines 26 and 28 illustrated in FIG. 2. In the schematic illustrated in FIG. 2, the line 26 is 110 VAC and line 28 is 220 VAC line voltage. When the device 10 is used as an interface between the breaker box 14 and the low voltage controller 30, the line power is terminated in the device 10 as illustrated in FIG. 2.

This line voltage is distributed from the interface device 10, in a manner which will be described in greater detail hereinafter, to 220 VAC loads 32 and 110 VAC loads 34. In a conventional residence or small commercial building, a typical 220 VAC load will comprise a water heater, window air conditioner, etc. Similarly, a 110 VAC load will typically comprise lights, a water cooler, etc. Lines 36 serve to supply power to alternate 110 VAC loads.

An important feature of the present invention is the provision of a device 10 which interfaces the breaker box 14 illustrated in FIG. 1 with a low voltage controller. More specifically, a low voltage controller 30 serves as a switching mechanism for selectively applying low voltage power to the various terminal, 1A, 1B, 2A . . . illustrated generally at 38 in FIG. 2. A suitable low voltage controller comprises the ES-1000 brand Energy Management System which is manufactured by Energy Shear of America, Inc., of Knoxville, Tenn. Such energy management systems employ means for selectively energizing the temrinals of the controller which in turn serve to selectively supply power to loads such as appliances, HVAC systems or the like which are duty cycled or otherwise switched on and off to control power consumption and manage energy.

Power to the controller 30 is supplied in the illustrated embodiment by a power source 40 of conventional design. This power source typically comprises a step-down transformer fed by line voltage. The controller selectively applies the power fed by this supply 40 to the terminals 38 in response to switching performed by the controller. As is often the case, the switching performed by the controller is pre-programmed into the system in cases where the controller is micro-processor based and capable of performing selective energization of the terminals 38 in response to a programmer's instruction.

The device 10 serves to interface the line voltage breaker box 14 with the low voltage controller 30 in a manner which avoids expensive high current wiring commonly associated with the installation of energy management controllers. Moreover, the device 10 can be easily mounted and wired through the conventional knock-outs 24 ordinarily associated with breaker boxes 14. More specifically, the device 10 in the preferred embodiment includes a single transformer 42 which is supplied through line 26. This transformer serves to step the line voltage, 110 VAC in the embodiment depicted in FIGS. 2 and 3, down to 12 VAC. This stepped-down voltage is then fed through rectifier 44 of conventional design for supplying power necessary to operate the switching accomplished by the device 10.

A plurality of low voltage connectors 46 are connected with the low voltage controller terminals 38. More specifically, and as shown in FIG. 1, the low voltage controller 30 is wired through illustrative lines 48' to the low voltage connector. Each terminal of the low voltage controller 30 is wired to associated terminals of the device 10 through lines 48 when necessary or desired (see FIG. 2). In this connection, when the low voltage controller supplies power as through lines 48, the operatively associated terminals of the low voltage connectors 46 of the device 10 are energized. For example, if the terminals proximate "1" of the device 10 are energized through lines 48' by the low voltage controller 30 supplying power to terminals 1A, power fed through line 50 (see FIG. 1) energizes actuator 52A. In the preferred embodiment, actuators 52A-F are operatively associated with terminal pairs "1"-"6", respectively, of the low voltage connectors 46 as is shown in FIG. 3.

Actuation of one of the actuators 52A-F, which preferably comprises single pole relays, serves to supply power through line 26' and/or 28' as illustrated in FIGS. 1 and 2 for energizing, or making power available to loads operatively associated and electrically connected to the breaker box. To facilitate installation and organization, the lines 26' and 28' are fed through the knock-out 22 shown in the wall of the breaker box.

A plurality of line voltage connectors generally indicated at 56 are provided. As illustrated in FIG. 3, the line voltage connectors 56 include terminals pairs "1"-"6" and operatively associated switches or contacts 54A-F, respectively. When actuator or relay 52A is energized in response to the low voltage controller, the operatively associated contact 54A is closed, thus allowing power to be supplied to the load connected to the terminals "1" of the line voltage connectors 56. Similarly, when relays 52B-F are energized, operatively associated switches or contacts 54B-F, respectively, are closed allowing line voltage to be supplied to a load associated with each of such contacts terminals. In this connection the low voltage controller, in an organized and systematic fashion, selectively supplies power to loads wired through the conventional breaker box 14 under the control of the energy management controller 30.

Figure 3:
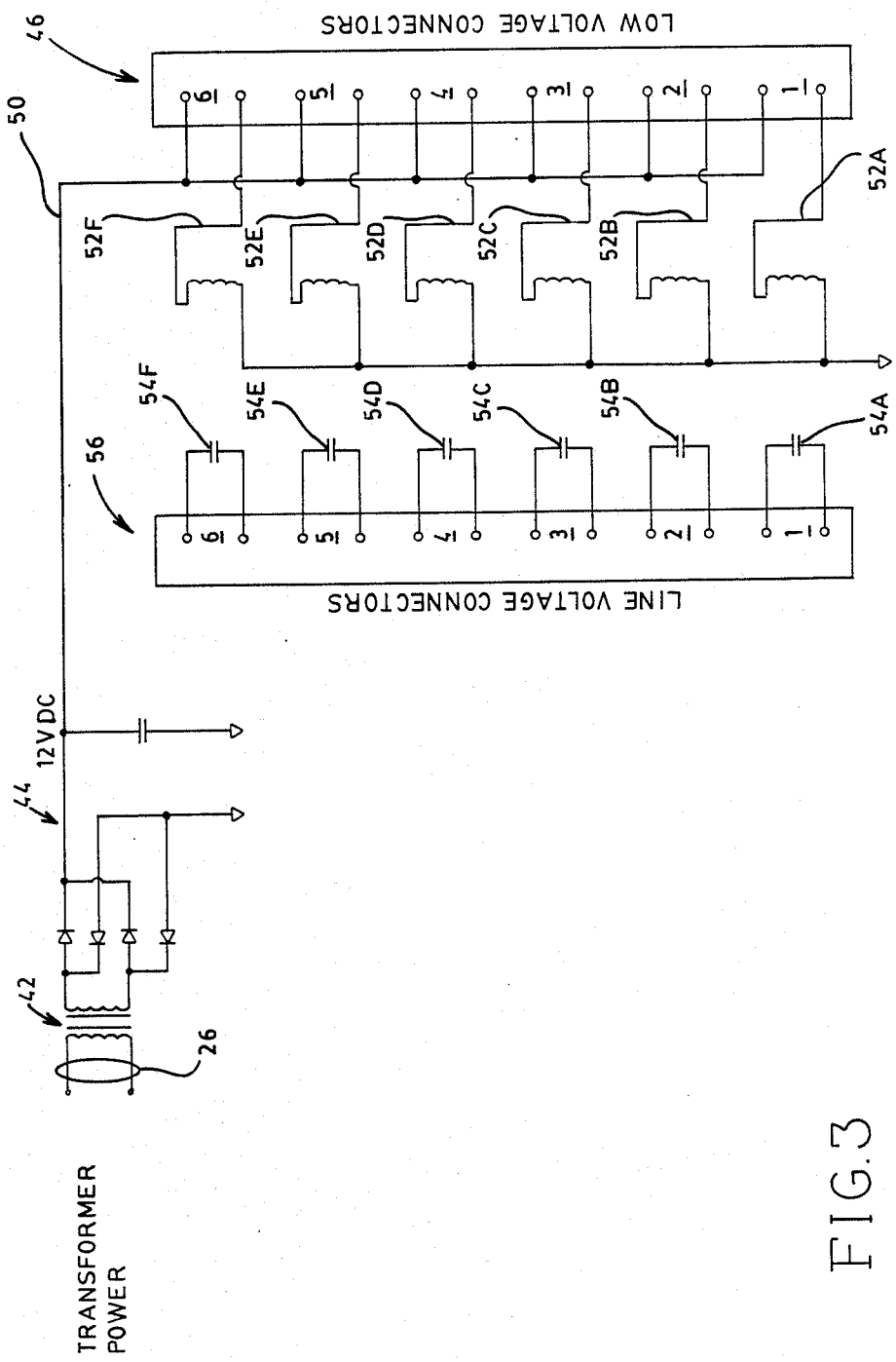
FIG. 3 illustrates a wiring diagram of the low voltage and line voltage connectors together with the contacts or switches which are closed in response to selective energization of the low voltage actuators.

The layout of the circuit diagram depicted in FIG. 2 and in FIG. 3, illustrates that a single transformer supplies power to the relays 52A-F associated with the low voltage connector. By eliminating the need of separate transformers for each relay, a substantial cost reduction is accomplished. Moreover, the interface device 10 is self-powered inasmuch as 110 VAC is supplied through line 26 from the connector box wiring. It is this line voltage that is fed through the transformer 42 and the operatively associated rectifier for providing the low voltage control selectively fed to the actuators 52A-F for controlling the line voltage connectors and associated contacts. The device 10 is easy to mount and wire, and provides substantial savings on expensive high current wiring normally associated with the installation of energy management systems. Further, the system can be used or installed at a remote location from the controlled device and connected thereto by such less expensive low voltage wiring.

While a preferred embodiment has been shown and described, it will be understood that there is no intent to limit the invention to such disclosure, but rather it is intended to cover all modification and alternate constructions falling within the spirit and scope of the invention as defined in the appended claims.

I claim:

1. A switching and interface device for being serially connected between, and thereby interfacing, a low voltage controller and a line voltage breaker box of conventional design having knock-outs such that conventional line voltage loads can be selectively energized through said device and breakers in said breaker box responsive to signals produced by such low voltage controller, said device comprising:

a housing independent of said conventional line voltage breaker box and said low voltage controller, said housing serving to shield electrical components contained and mounted therein;

a plurality of low voltage connectors electrically connected with said low voltage controller, each of said connectors including low voltage actuator means selectively energized by said low voltage controller, said low voltage connectors being mounted within said housing; and a plurality of line voltage connectors electrically connecting line voltage to breakers in said conventional breaker box, each of said connectors including a line voltage contact operatively associated with at least one of said actuator means whereby energization of said actuator means causes said contact to close thereby supplying power to said breakers and loads such as appliances operatively associated therewith, said line voltage connectors being mounted within said housing.

2. The switching device of claim 1 wherein said low voltage actuator means comprises a plurality of relays selectively energized by said low voltage controller.

3. The device of claim 2 including a step-down transformer and a rectifier serially connected with line voltage and mounted within said housing, whereby low voltage power is supplied to each of said relays through said step-down transformer and rectifier.

4. The device of claim 3 wherein said line voltage connectors are electrically connected to respective breakers contained in said breaker box by wiring extending through respective knock-outs of said breaker box whereby said device can be readily wired to said breaker box for selectively energizing loads under control of said low voltage controller.

5. The switching device of claim 1 wherein said low voltage actuator means comprises plurality of relays selectively energized by said low voltage controller, and further including a step-down transformer and a rectifier serially connected with line voltage and mounted within said device housing, whereby low voltage power is supplied to each of said relays through said step-down transformer and rectifier, and line voltage connectors electrically connected to respective breakers contained in said breaker box by wiring extending through respective knock-outs carried by said breaker box whereby said device can be readily wired to said breaker box for selectively energizing loads under control of said low voltage controller.

6. A switching and interface device for being serially connected between, and thereby interfacing, a low voltage controller and a line voltage breaker box of conventional design having knock-outs such that conventional line voltage loads can be selectively energized through said device and breakers in said breaker box responsive to signals produced by such low voltage controller, said device comprising:

a housing independent of said conventional line voltage breaker box and said low voltage controller, said housing serving to shield electrical components contained and mounted therein;

a plurality of low voltage connectors electrically connected with said low voltage controller, each of said connectors including low voltage actuator means comprising a plurality of relays selectively energized by said low voltage controller, said low voltage connectors being mounted within said housing;

a plurality of line voltage connectors electrically connecting line voltage to breakers in said conventional breaker box, each of said connectors including a line voltage contact operatively associated with at least one of said actuator means whereby energization of said actuator means causes said contact to close thereby supplying power to said breakers and loads such as appliances operatively associated therewith, said line voltage connectors being mounted within said housing;

a step-down transformer and a rectifier serially connected with line voltage and mounted within said device housing, whereby low voltage power is supplied to each of said relays through said step-down transformer and rectifier; and line voltage connectors electrically connected to respective breakers contained in said breaker box by wiring extending through respective knock-outs carried by said breaker box whereby said device can be readily wired to said breaker box for selectively energizing loads under control of said low voltage controller.

* * * * *